United States Patent
Hu et al.

(10) Patent No.: US 12,506,566 B2
(45) Date of Patent: Dec. 23, 2025

(54) METHOD AND DEVICE FOR DETERMINING BITS OF A HYBRID AUTOMATIC REPEAT REQUEST ACKNOWLEDGEMENT (HARQ-ACK) CODEBOOK

(71) Applicant: Apogee Networks, LLC, Dallas, TX (US)

(72) Inventors: Yang Hu, Shanghai (CN); Xiaobo Zhang, Shanghai (CN)

(73) Assignee: Apogee Networks, LLC, Dallas, TX (US)

( * ) Notice: Subject to any disclaimer, the term of this patent is extended or adjusted under 35 U.S.C. 154(b) by 405 days.

(21) Appl. No.: 17/842,747

(22) Filed: Jun. 16, 2022

(65) Prior Publication Data

US 2022/0407633 A1    Dec. 22, 2022

(30) Foreign Application Priority Data

Jun. 17, 2021    (CN) .......................... 202110669305.1

(51) Int. Cl.
*H04L 1/1829*    (2023.01)
*H04L 5/00*    (2006.01)
(Continued)

(52) U.S. Cl.
CPC .......... *H04L 1/1861* (2013.01); *H04L 1/1864* (2013.01); *H04L 5/0055* (2013.01);
(Continued)

(58) Field of Classification Search
CPC ... H04L 1/1861; H04L 1/1864; H04L 5/0055; H04L 1/1812; H04L 5/0098; H04L 5/001;
(Continued)

(56) References Cited

U.S. PATENT DOCUMENTS

2019/0268803 A1*    8/2019    He ....................... H04W 28/04
2019/0306841 A1*    10/2019   Huang .................. H04L 5/0055
(Continued)

FOREIGN PATENT DOCUMENTS

CN        104396174 A      3/2015
CN        110535571 A     12/2019
(Continued)

OTHER PUBLICATIONS

Oppo, "Discussion on the remaining issues of HARQ enhancements," 3GPP TSG RAN WG1 #104b-e, R1-2102367, e-Meeting, Apr. 12-20, 2021 (Year: 2021).*
(Continued)

*Primary Examiner* — Salvador E Rivas
(74) *Attorney, Agent, or Firm* — Volpe Koenig

(57) ABSTRACT

The present disclosure provides a method and a device in a node used for wireless communications. A first receiver receives a first signaling, the first signaling being used to determine a target serving cell and a first time unit, where the target serving cell is either a first serving cell or a second serving cell; a first transmitter determines a first HARQ-ACK codebook and transmits a first signal in the first time unit on the target serving cell, the first signal carrying the first HARQ-ACK codebook; herein, a first time is a boundary time for an active UL BWP change on the first serving cell, a start time for the first time unit being no earlier than the first time; the target serving cell is used to determine whether the first HARQ-ACK codebook comprises a HARQ-ACK information bit for the second time unit on the first serving cell.

20 Claims, 4 Drawing Sheets

(51) Int. Cl.
*H04L 25/03* (2006.01)
*H04L 27/26* (2006.01)
*H04W 72/044* (2023.01)
*H04W 72/232* (2023.01)
*H04W 74/00* (2009.01)
*H04B 7/0456* (2017.01)
*H04L 1/1812* (2023.01)
*H04W 36/00* (2009.01)
*H04W 72/0446* (2023.01)

(52) U.S. Cl.
CPC .... *H04L 25/03898* (2013.01); *H04L 27/2671* (2013.01); *H04W 72/044* (2013.01); *H04W 72/232* (2023.01); *H04W 74/004* (2013.01); *H04B 7/0478* (2013.01); *H04L 1/1812* (2013.01); *H04W 36/008355* (2023.05); *H04W 36/008357* (2023.05); *H04W 72/0446* (2013.01)

(58) Field of Classification Search
CPC ... H04L 5/0094; H04L 5/0053; H04L 1/1607; H04L 1/1806; H04L 25/03012; H04L 27/2671; H04L 25/0389; H04L 25/03898; H04W 72/044; H04W 36/008355; H04W 36/008357; H04W 72/0446; H04W 72/232; H04W 74/004; H04B 7/04026; H04B 7/0478
See application file for complete search history.

(56) References Cited

U.S. PATENT DOCUMENTS

| | | | | |
|---|---|---|---|---|
| 2019/0313386 | A1* | 10/2019 | Hwang | H04L 5/0094 |
| 2020/0032031 | A1* | 1/2020 | Dotson | C08J 3/203 |
| 2021/0136695 | A1* | 5/2021 | Liu | H04L 5/0055 |
| 2021/0234643 | A1* | 7/2021 | Wang | H04L 1/1887 |
| 2022/0174709 | A1* | 6/2022 | Chen | H04L 5/0055 |
| 2022/0201726 | A1* | 6/2022 | Papasakellariou | H04W 72/1273 |
| 2023/0036564 | A1* | 2/2023 | Bae | H04L 1/1861 |
| 2023/0412320 | A1* | 12/2023 | Lei | H04L 1/1861 |
| 2023/0413271 | A1* | 12/2023 | Jiang | H04L 1/1812 |
| 2024/0031083 | A1* | 1/2024 | Choi | H04W 72/232 |
| 2024/0039660 | A1* | 2/2024 | Zeng | H04L 1/1861 |

FOREIGN PATENT DOCUMENTS

| | | |
|---|---|---|
| CN | 112751654 A | 5/2021 |
| WO | 2020146462 A1 | 7/2020 |
| WO | WO-2021187845 A1 * | 9/2021 |

OTHER PUBLICATIONS

"ETSI TS 138 213 V15.5.0", May 2019, pp. 1-106 (Year: 2019).*
T.-K. Le, U. Salim and F. Kaltenberger, "An Overview of Physical Layer Design for Ultra-Reliable Low-Latency Communications in 3GPP Releases 15, 16, and 17," in IEEE Access, vol. 9, pp. 433-444, 2021, doi: 10.1109/ACCESS.2020.3046773. (Year: 2021).*
"ETSI TS 138 306 V15.6.0", Jul. 2019, pp. 1-55 (Year: 2019).*
First Office Action of Chinese patent application No. CN202110669305.1 dated Mar. 14, 2024.
First Search Report of Chinese patent application No. CN202110669305.1 dated Mar. 12, 2024.
Ericsson "HARQ-ACK Enhancements for IIoT/URLLC" 3GPP TSG-RAN WG1 Meeting #103-e R1-2007707 Nov. 2, 2020.
Third Generation Partnership Project, "Technical Specification Group Radio Access Network; NR; Multiplexing and channel coding (Release 16)," 3GPP TS 38.212 V16.5.0 (Mar. 2021).
Third Generation Partnership Project, "Technical Specification Group Radio Access Network; NR; Physical layer procedures for control (Release 16)," 3GPP TS 38.213 V16.5.0 (Mar. 2021).

* cited by examiner

METHOD AND DEVICE FOR DETERMINING BITS OF A HYBRID AUTOMATIC REPEAT REQUEST ACKNOWLEDGEMENT (HARQ-ACK) CODEBOOK

CROSS REFERENCE TO RELATED APPLICATIONS

This application claims the priority benefit of Chinese Patent Application No. 202110669305.1, filed on Jun. 17, 2021, the full disclosure of which is incorporated herein by reference.

BACKGROUND

Technical Field

The present disclosure relates to transmission methods and devices in wireless communication systems, and in particular to a method and device for radio signal transmission in a wireless communication system supporting cellular networks.

Related Art

To fulfill requirements for low latency in Ultra Reliable and Low Latency Communication (URLLC) services, the 3rd Generation Partner Project (3GPP) have agreed upon support for the functionality of carrier switching in Physical Uplink Control CHannel (PUCCH) after discussions on NR Release 17.

SUMMARY

After introducing the function of PUCCH carrier switching, how to handle generation of Type-1 HARQ-ACK codebook to be reported on a PUCCH during active BWP changes becomes a key issue to be addressed.

To address the above problem, the present disclosure provides a solution. In the statement above the transmission of a HARQ-ACK codebook in the UpLink is taken only for example; the present disclosure also applies to other scenarios, such as transmissions in the Downlink (DL) and SideLink (SL), where similar technical effects can be achieved. Additionally, the adoption of a unified solution for various scenarios, including but not limited to UL, DL and SL, contributes to the reduction of hardcore complexity and costs. It should be noted that if no conflict is incurred, embodiments in a User Equipment (UE) in the present disclosure and the characteristics of the embodiments are also applicable to a base station, and vice versa. What's more, the embodiments in the present disclosure and the characteristics in the embodiments can be arbitrarily combined if there is no conflict.

In one embodiment, interpretations of the terminology in the present disclosure refer to definitions given in the 3GPP TS36 series.

In one embodiment, interpretations of the terminology in the present disclosure refer to definitions given in the 3GPP TS38 series.

In one embodiment, interpretations of the terminology in the present disclosure refer to definitions given in the 3GPP TS37 series.

In one embodiment, interpretations of the terminology in the present disclosure refer to definitions given in Institute of Electrical and Electronics Engineers (IEEE) protocol specifications.

The present disclosure provides a method in a first node for wireless communications, comprising:

receiving a first signaling, the first signaling being used to determine a target serving cell and a first time unit, the target serving cell being either a first serving cell or a second serving cell, where the first serving cell and the second serving cell are two different serving cells; and determining a first HARQ-ACK codebook and transmitting a first signal in the first time unit on the target serving cell, the first signal carrying the first HARQ-ACK codebook, the first HARQ-ACK codebook comprising at least one HARQ-ACK information bit;

herein, a first time is a boundary time for an active Uplink (UL) BWP change on the first serving cell, a start of the first time unit is no earlier than the first time; a second time unit is a time unit before the first time; the target serving cell is used to determine whether the first HARQ-ACK codebook comprises one or more HARQ-ACK information bits for the second time unit on the first serving cell.

In one embodiment, a problem to be solved in the present disclosure includes: how to determine HARQ-ACK information bits(s) comprised in the first HARQ-ACK codebook according to the target serving cell as an active UL BWP changes in a specific duration on the first serving cell.

In one embodiment, a problem to be solved in the present disclosure includes: how to determine based on a serving cell used for transmitting PUCCH whether to drop HARQ-ACK information bit transmission in a slot (or, DL slot) before changes happen to an active UL BWP.

In one embodiment, characteristics of the above method include: a serving cell used for transmitting PUCCH indicated by the first signaling (e.g., a DCI) is used to determine a number of HARQ-ACK information bits comprised in a Type-1 HARQ-ACK generated for a dedicated serving cell.

In one embodiment, an advantage of the above method includes reducing the influence of BWP change on HARQ-ACK generation, thus guaranteeing the flexibility of scheduling by the base station.

In one embodiment, an advantage of the above method includes giving consideration to both the reliability of HARQ-ACK feedback and the feedback overhead.

In one embodiment, an advantage of the above method includes benefit for forward compatibility.

In one embodiment, an advantage of the above method includes avoiding unnecessary impact on a (Type-1) HARQ-ACK codebook being transmitted in a PUCCH on a serving cell resulting from an active UL BWP change on another serving cell.

According to one aspect of the present disclosure, the above method is characterized in that, when the target serving cell is the first serving cell, the first HARQ-ACK codebook does not comprise any HARQ-ACK information bit for the second time unit on the first serving cell; when the target serving cell is the second serving cell, the first HARQ-ACK codebook comprises one or more HARQ-ACK information bits for the second time unit on the first serving cell.

According to one aspect of the present disclosure, the above method is characterized in that, the first serving cell and the second serving cell belong to a same PUCCH group.

According to one aspect of the present disclosure, the above method is characterized in that, the first time unit is a time unit for an active UL BWP on the target serving cell, while the second time unit is a time unit for an active Downlink (DL) BWP on the first serving cell.

According to one aspect of the present disclosure, the above method is characterized in that,
a first timing value is used to determine the second time unit, and the first timing value is among a first timing value set, the first timing value set being pre-defined or configurable.

According to one aspect of the present disclosure, the above method is characterized in that,
all multicarrier symbols comprised in the second time unit are configured as properties beyond uplink.

According to one aspect of the present disclosure, the above method is characterized in that,
a total number of HARQ-ACK information bit(s) comprised in the first HARQ-ACK codebook is larger than a first upper-limit value, where the first upper-limit value is pre-defined or configurable; when the target serving cell is the first serving cell, the first HARQ-ACK codebook is used to generate a first bit sequence, the first bit sequence being used to generate the first signal; when the target serving cell is the second serving cell, an output by the first HARQ-ACK codebook through a first operation is used to generate a first bit sequence, the first bit sequence being used to generate the first signal; the first operation comprises at least one of logical AND operation for multiple bits or logical OR operation for multiple bits.

In one embodiment, an advantage of the above method includes ensuring the chance of correct reception of HARQ-ACK information bit(s).

In one embodiment, an advantage of the above method includes ensuring better adaptability to different resource allocation modes.

According to one aspect of the present disclosure, the above method is characterized in that,
the first HARQ-ACK codebook is a Type-1 HARQ-ACK codebook.

The present disclosure provides a method in a second node for wireless communications, comprising:
transmitting a first signaling, the first signaling being used to determine a target serving cell and a first time unit, the target serving cell being either a first serving cell or a second serving cell, where the first serving cell and the second serving cell are two different serving cells; and
receiving a first signal in the first time unit on the target serving cell, the first signal carrying the first HARQ-ACK codebook, the first HARQ-ACK codebook comprising at least one HARQ-ACK information bit;
herein, a first time is a boundary time for an active Uplink (UL) BWP change on the first serving cell, a start of the first time unit is no earlier than the first time; a second time unit is a time unit before the first time; the target serving cell is used to determine whether the first HARQ-ACK codebook comprises one or more HARQ-ACK information bits for the second time unit on the first serving cell.

According to one aspect of the present disclosure, the above method is characterized in that,
when the target serving cell is the first serving cell, the first HARQ-ACK codebook does not comprise any HARQ-ACK information bit for the second time unit on the first serving cell; when the target serving cell is the second serving cell, the first HARQ-ACK codebook comprises one or more HARQ-ACK information bits for the second time unit on the first serving cell.

According to one aspect of the present disclosure, the above method is characterized in that,
the first serving cell and the second serving cell belong to a same PUCCH group.

According to one aspect of the present disclosure, the above method is characterized in that,
the first time unit is a time unit for an active UL BWP on the target serving cell, while the second time unit is a time unit for an active Downlink (DL) BWP on the first serving cell.

According to one aspect of the present disclosure, the above method is characterized in that,
the a first timing value is used to determine the second time unit, and the first timing value is among a first timing value set, the first timing value set being pre-defined or configurable.

According to one aspect of the present disclosure, the above method is characterized in that,
all multicarrier symbols comprised in the second time unit are configured as properties beyond uplink.

According to one aspect of the present disclosure, the above method is characterized in that,
a total number of HARQ-ACK information bit(s) comprised in the first HARQ-ACK codebook is larger than a first upper-limit value, where the first upper-limit value is pre-defined or configurable; when the target serving cell is the first serving cell, the first HARQ-ACK codebook is used to generate a first bit sequence, the first bit sequence being used to generate the first signal; when the target serving cell is the second serving cell, an output by the first HARQ-ACK codebook through a first operation is used to generate a first bit sequence, the first bit sequence being used to generate the first signal; the first operation comprises at least one of logical AND operation for multiple bits or logical OR operation for multiple bits.

According to one aspect of the present disclosure, the above method is characterized in that,
the first HARQ-ACK codebook is a Type-1 HARQ-ACK codebook.

The present disclosure provides a first node for wireless communications, comprising:
a first receiver, receiving a first signaling, the first signaling being used to determine a target serving cell and a first time unit, the target serving cell being either a first serving cell or a second serving cell, where the first serving cell and the second serving cell are two different serving cells; and
a first transmitter, determining a first HARQ-ACK codebook and transmitting a first signal in the first time unit on the target serving cell, the first signal carrying the first HARQ-ACK codebook, the first HARQ-ACK codebook comprising at least one HARQ-ACK information bit;
herein, a first time is a boundary time for an active Uplink (UL) BWP change on the first serving cell, a start of the first time unit is no earlier than the first time; a second time unit is a time unit before the first time; the target serving cell is used to determine whether the first HARQ-ACK codebook comprises one or more HARQ-ACK information bits for the second time unit on the first serving cell.

The present disclosure provides a second node for wireless communications, comprising:
a second transmitter, transmitting a first signaling, the first signaling being used to determine a target serving cell and a first time unit, the target serving cell being either a first serving cell or a second serving cell, where the first serving cell and the second serving cell are two different serving cells; and
a second receiver, receiving a first signal in the first time unit on the target serving cell, the first signal carrying the first HARQ-ACK codebook, the first HARQ-ACK codebook comprising at least one HARQ-ACK information bit;

herein, a first time is a boundary time for an active Uplink (UL) BWP change on the first serving cell, a start of the first time unit is no earlier than the first time; a second time unit is a time unit before the first time; the target serving cell is used to determine whether the first HARQ-ACK codebook comprises one or more HARQ-ACK information bits for the second time unit on the first serving cell.

In one embodiment, the method in the present disclosure has the following advantages:

reducing the impact on HARQ-ACK codebook generation by BWP change;

ensuring the flexibility of scheduling by base station;

optimizing and balancing the reliability and overhead of HARQ-ACK feedback based on different situations;

avoiding unnecessary impact on a (Type-1) HARQ-ACK codebook being transmitted in a PUCCH on a serving cell resulting from an active UL BWP change on another serving cell.

ensuring the chance of correct reception of HARQ-ACK information bit(s).

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
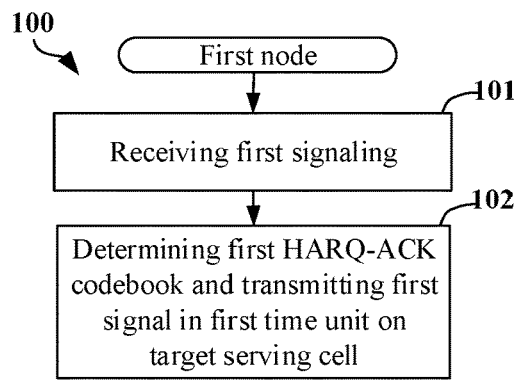
FIG. 1 illustrates a flowchart of processing of a first node according to one embodiment of the present disclosure.

Embodiment 1 illustrates a flowchart of processing of a first node according to one embodiment of the present disclosure, as shown in FIG. 1.

In Embodiment 1, the first node in the present disclosure receives a first signaling in step 101; determines a first HARQ-ACK codebook and transmits a first signal in a first time unit on a target serving cell in step 102.

In Embodiment 1, the first signaling is used to determine the target serving cell and the first time unit, the target serving cell being either a first serving cell or a second serving cell, where the first serving cell and the second serving cell are two different serving cells; the first signal carries the first HARQ-ACK codebook, the first HARQ-ACK codebook comprising at least one HARQ-ACK information bit; a first time is a boundary time for an active Uplink (UL) BWP change on the first serving cell, a start of the first time unit is no earlier than the first time; a second time unit is a time unit before the first time; the target serving cell is used to determine whether the first HARQ-ACK codebook comprises one or more HARQ-ACK information bits for the second time unit on the first serving cell.

In one embodiment, the first signal in the present disclosure comprises a radio signal.

In one embodiment, the first signal in the present disclosure comprises a radio frequency signal.

In one embodiment, the first signal in the present disclosure comprises a baseband signal.

In one embodiment, the first signal in the present disclosure occupies a positive integer number of multicarrier symbol(s) in time domain.

In one embodiment, the first signal in the present disclosure occupies a positive integer number of Resource Element(s) (RE(s)) in time-frequency domain.

In one embodiment, the phrase that the first signal carries the first HARQ-ACK codebook means: the first signal comprises an output by all or part of bits in the first HARQ-ACK codebook sequentially through some or all of CRC Insertion, Segmentation, Code Block (CB)-level CRC Insertion, Channel Coding, Rate Matching, Concatenation, Scrambling, Modulation, Spreading, Layer Mapping, Precoding, Mapping to Resource Element, Multicarrier Symbol Generation, and Modulation and Upconversion.

In one embodiment, the first signal is transmitted in a PUCCH.

In one embodiment, the first signal is transmitted in a Physical Uplink Shared CHannel (PUSCH).

In one embodiment, the first signaling comprises an RRC signaling.

In one embodiment, the first signaling comprises an Information Element (IE).

In one embodiment, the first signaling is an IE.

In one embodiment, the first signaling comprises one or more fields in an IE.

In one embodiment, the first signaling comprises a MAC CE signaling.

In one embodiment, the first signaling is a DCI format.

In one embodiment, the first signaling comprises one or more fields in a DCI.

In one embodiment, the first signaling is DCI format 1_0, for the specific definition of the DCI format 1_0, refer to 3GPP TS38.212, Chapter 7.3.1.2.

In one embodiment, the first signaling is DCI format 1_1, for the specific definition of the DCI format 1_1, refer to 3GPP TS38.212, Chapter 7.3.1.2.

In one embodiment, the first signaling is DCI format 1_2, for the specific definition of the DCI format 1_2, refer to 3GPP TS38.212, Chapter 7.3.1.2.

In one embodiment, the first signaling is a DownLink Grant Signaling.

In one embodiment, the first signaling is an UpLink Grant Signaling.

In one embodiment, the first signaling is transmitted in a downlink physical layer control channel (i.e., a downlink channel only capable of bearing physical layer signaling).

In one embodiment, the downlink physical layer control channel is a Physical Downlink Control CHannel (PDCCH).

In one embodiment, the downlink physical layer control channel is a short PDCCH (sPDCCH).

In one embodiment, the downlink physical layer control channel is a Narrow Band PDCCH (NB-PDCCH).

In one embodiment, the first signaling comprises a higher layer signaling.

In one embodiment, the first signaling is used to determine whether the target serving cell is the first serving cell or the second serving cell.

In one embodiment, the first signaling indicates whether the target serving cell is the first serving cell or the second serving cell.

In one embodiment, the first signaling explicitly indicates whether the target serving cell is the first serving cell or the second serving cell.

In one embodiment, the first signaling implicitly indicates whether the target serving cell is the first serving cell or the second serving cell.

In one embodiment, a field in the first signaling indicates whether the target serving cell is the first serving cell or the second serving cell.

In one embodiment, the first signaling is used to indicate relative configurations for determining whether the target serving cell is the first serving cell or the second serving cell.

In one embodiment, a cell identifier of the first serving cell is smaller than a cell identifier of the second serving cell.

In one embodiment, a cell identifier of the first serving cell is larger than a cell identifier of the second serving cell.

In one embodiment, the first serving cell is a Primary cell or a Primary secondary cell, while the second serving cell is a secondary cell.

In one embodiment, the second serving cell is a Primary cell or a Primary secondary cell, while the first serving cell is a secondary cell.

In one embodiment, the first serving cell and the second serving cell are respectively two different secondary cells.

In one embodiment, the first signaling indicates the first time unit.

In one embodiment, the first signaling explicitly indicates the first time unit.

In one embodiment, the first signaling implicitly indicates the first time unit.

In one embodiment, the first signaling indicates the first time unit by indicating an offset.

In one embodiment, the first signaling indicates transmitting a PUCCH in the first time unit on the target serving cell.

In one embodiment, the first time unit is a time unit used for transmitting a PUCCH indicated by the first signaling.

In one embodiment, a said time unit in the present disclosure is for a specific serving cell.

In one embodiment, a said time unit in the present disclosure is for an active Bandwidth part (BWP) on a specific serving cell.

In one embodiment, the first time unit and the second time unit are different kinds of time units.

In one embodiment, a said time unit in the present disclosure is a slot.

In one embodiment, a said time unit in the present disclosure is a slot or a sub-slot.

In one embodiment, a said time unit in the present disclosure is a DownLink slot (DL slot) or an UpLink slot (UL slot).

In one embodiment, a said time unit in the present disclosure comprises at least one multicarrier symbol.

In one embodiment, a number of multicarrier symbols comprised in a said time unit in the present disclosure is equal to one of 14, 7, 2, 4, 6, and 12.

In one embodiment, a said multicarrier symbol in the present disclosure is an Orthogonal Frequency Division Multiplexing (OFDM) Symbol.

In one embodiment, a said multicarrier symbol in the present disclosure is a Single Carrier-Frequency Division Multiple Access (SC-FDMA) symbol.

In one embodiment, a said multicarrier symbol in the present disclosure is a Discrete Fourier Transform Spread OFDM (DFT-S-OFDM) symbol.

In one embodiment, a said multicarrier symbol in the present disclosure is a Filter Bank Multi Carrier (FBMC) symbol.

In one embodiment, a said multicarrier symbol in the present disclosure comprises a Cyclic Prefix (CP).

In one embodiment, the first node determines one or more occasion sets according to a sequence of given pseudo-codes, and generates at least one HARQ-ACK information bit per element comprised in one or more occasion sets; the first HARQ-ACK codebook consists of HARQ-ACK information bits generated by all elements comprised in one or more occasion sets; a said occasion set is a set of occasions for candidate PDSCH reception or SPS PDSCH release, where PDSCH refers to Physical Downlink Shared CHannel and SPS refers to Semi-persistent scheduling, an element in a said occasion set is an occasion for candidate PDSCH reception or SPS PDSCH release.

In one subembodiment, a said occasion set is a set of occasions for candidate PDSCH reception or SPS PDSCH release for a serving cell.

In one embodiment, the first node determines the first HARQ-ACK codebook in a way a Type-1 HARQ-ACK codebook is generated.

In one embodiment, the first node generates the first HARQ-ACK codebook based on partial or all description of how to determine a Type-1 HARQ-ACK codebook in 3GPP TS38.213.

In one embodiment, the first HARQ-ACK bit sequence comprises at least one HARQ-ACK information bit for a PDSCH scheduled by DCI.

In one embodiment, the first HARQ-ACK codebook comprises one or more HARQ-ACK information bits for a PDSCH scheduled by the first signaling.

In one embodiment, a HARQ-ACK Information bit in the first HARQ-ACK codebook indicates an ACK or a NACK.

In one embodiment, the first HARQ-ACK codebook is a Type-1 HARQ-ACK codebook.

In one embodiment, the first HARQ-ACK codebook comprises at least one HARQ-ACK information bit for the first serving cell.

In one embodiment, the first HARQ-ACK codebook comprises one or more HARQ-ACK information bits for a time unit other than the second time unit on the first serving cell.

In one embodiment, the boundary time in the present disclosure refers to: start time.

In one embodiment, the boundary time in the present disclosure refers to: end time.

In one embodiment, the boundary time in the present disclosure refers to: an end for a time unit.

In one embodiment, the boundary time in the present disclosure refers to: an end for a time unit.

In one embodiment, the phrase in the present disclosure that the first time is a boundary time for an active Uplink (UL) BWP change on the first serving cell has a meaning that the first time is a start of a time unit which is occupied by the active UL BWP change on the first serving cell.

In one embodiment, the phrase in the present disclosure that the first time is a boundary time for an active Uplink (UL) BWP change on the first serving cell has a meaning that the first time is an end of a time unit which is occupied by the active UL BWP change on the first serving cell.

In one embodiment, a start time for the second time unit is before the first time.

In one embodiment, the phrase in the present disclosure that the second time unit is a time unit before the first time means that the second time unit is a time unit of which a start time is before the first time.

In one embodiment, an end time for the second time unit is before the first time.

In one embodiment, the phrase in the present disclosure that the second time unit is a time unit before the first time means that the second time unit is a time unit of which an end time is before the first time.

In one embodiment, the phrase in the present disclosure that the target serving cell is used to determine whether the first HARQ-ACK codebook comprises one or more HARQ-ACK information bit for the second time unit on the first serving cell means that when the target serving cell is the first serving cell, the first HARQ-ACK codebook does not comprise any HARQ-ACK information bit for the second time unit on the first serving cell; when the target serving cell is the second serving cell, the first HARQ-ACK codebook comprises one or more HARQ-ACK information bits for the second time unit on the first serving cell.

In one embodiment, the phrase in the present disclosure that the target serving cell is used to determine whether the first HARQ-ACK codebook comprises one or more HARQ-ACK information bit for the second time unit on the first serving cell means that when the target serving cell is the first serving cell, the first HARQ-ACK codebook comprises one or more HARQ-ACK information bits for the second time unit on the first serving cell; when the target serving cell is the second serving cell, the first HARQ-ACK codebook does not comprise any HARQ-ACK information bit for the second time unit on the first serving cell.

In one embodiment, a HARQ-ACK information bit for the second time unit on the first serving cell in the present disclosure is: a HARQ-ACK information bit generated for an occasion for candidate PDSCH reception or SPS PDSCH release corresponding to the second time unit on the first serving cell.

In one embodiment, within a duration before a start of the first time unit and after a start of the second time unit, no changes happen to an active UL BWP on the second serving cell.

In one embodiment, within a duration before a start of the first time unit and after a start of the second time unit, no changes happen to active DL BWPs on each serving cell.

In one embodiment, the first node is indicated with the following configuration: both the first serving cell and the second serving cell are used for performing PUCCH carrier switching.

In one embodiment, the first node is configured to transmit PUCCH on either of the first serving cell and the second serving cell.

In one embodiment, the first node is configured to transmit PUCCH carrying HARQ-ACK on either of the first serving cell and the second serving cell.

Embodiment 2

Figure 2:
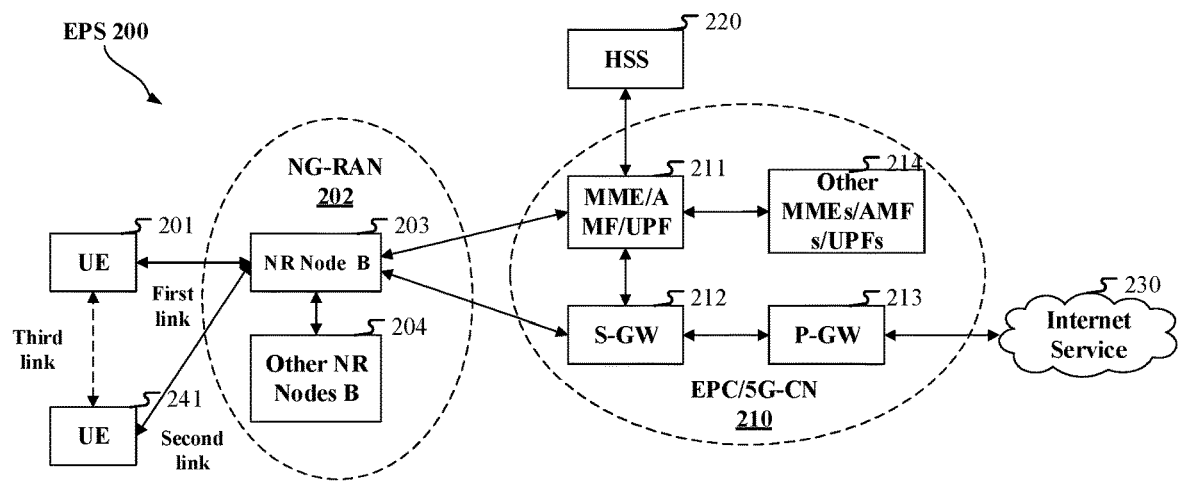
FIG. 2 illustrates a schematic diagram of a network architecture according to one embodiment of the present disclosure.

Embodiment 2 illustrates a schematic diagram of a network architecture according to the present disclosure, as shown in FIG. 2.

FIG. 2 is a diagram illustrating a network architecture 200 of 5G NR, Long-Term Evolution (LTE) and Long-Term Evolution Advanced (LIE-A) systems. The 5G NR or LIE network architecture 200 may be called an Evolved Packet System (EPS) 200 or other suitable terminology. The EPS 200 may comprise one or more UEs 201, an NG-RAN 202, a Evolved Packet Core/5G-Core Network (EPC/5G-CN) 210, a Home Subscriber Server (HSS) 220 and an Internet Service 230. The EPS 200 may be interconnected with other access networks. For simple description, the entities/interfaces are not shown. As shown in FIG. 2, the EPS 200 provides packet switching services. Those skilled in the art will find it easy to understand that various concepts presented throughout the present disclosure can be extended to networks providing circuit switching services or other cellular networks. The NG-RAN 202 comprises an NR node B (gNB) 203 and other gNBs 204. The gNB 203 provides UE 201 oriented user plane and control plane terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the EPC/5G-CN 210 for the UE 201. Examples of UE 201 include cellular phones, smart phones, Session Initiation Protocol (SIP) phones, laptop computers, Personal Digital Assistant (PDA), Satellite Radios, non-terrestrial base station communications, satellite mobile communications, Global Positioning Systems (GPSs), multimedia devices, video devices, digital audio players (for example, MP3 players), cameras, games consoles, unmanned aerial vehicles, air vehicles, narrowband physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an S1/NG interface. The EPC/5G-CN 210 comprises a Mobility Management Entity (MME)/Authentication Management Field(AMF)/User Plane Function (UPF) 211, other MMEs/AMFs/UPFs 214, a Service Gateway (S-GW)

212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet Service 230. The Internet Service 230 comprises IP services corresponding to operators, specifically including Internet, Intranet, IP Multimedia Subsystem (IMS) and Packet Switching Streaming (PSS) services.

In one embodiment, the UE 201 corresponds to the first node in the present disclosure.

In one embodiment, the UE 241 corresponds to the second node in the present disclosure.

In one embodiment, the gNB 203 corresponds to the first node in the present disclosure.

In one embodiment, the gNB 203 corresponds to the second node in the present disclosure.

In one embodiment, the UE 241 corresponds to the first node in the present disclosure.

In one embodiment, the UE 201 corresponds to the second node in the present disclosure.

Embodiment 3

Figure 3:
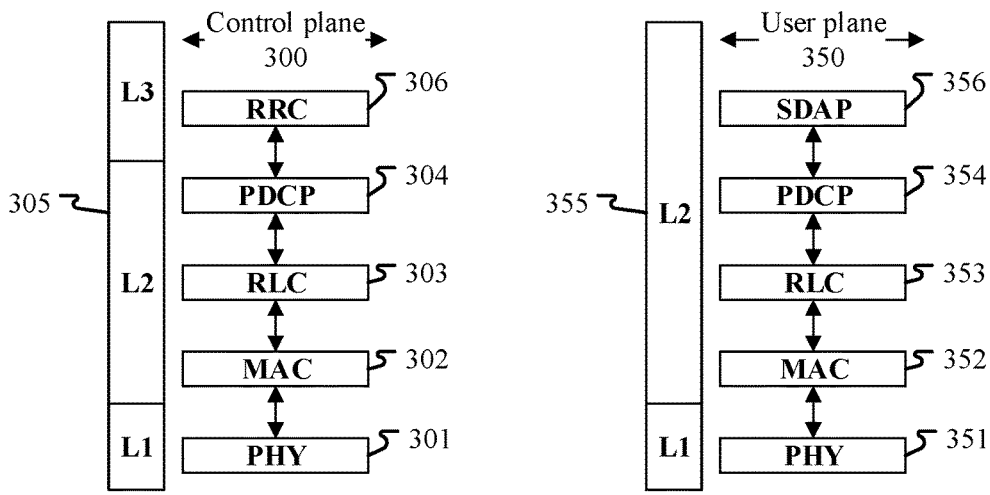
FIG. 3 illustrates a schematic diagram of a radio protocol architecture of a user plane and a control plane according to one embodiment of the present disclosure.

Embodiment 3 illustrates a schematic diagram of a radio protocol architecture of a user plane and a control plane according to the present disclosure, as shown in FIG. 3. FIG. 3 is a schematic diagram illustrating an embodiment of a radio protocol architecture of a user plane 350 and a control plane 300. In FIG. 3, the radio protocol architecture for a control plane 300 between a first communication node (UE, gNB or, RSU in V2X) and a second communication node (gNB, UE, or RSU in V2X), or between two UEs, is represented by three layers, i.e., layer 1, layer 2 and layer 3. The layer 1 (L1) is the lowest layer which performs signal processing functions of various PHY layers. The L1 is called PHY 301 in the present disclosure. The layer 2 (L2) 305 is above the PHY 301, and is in charge of the link between a first communication node and a second communication node as well as between two UEs via the PHY 301. The L2 305 comprises a Medium Access Control (MAC) sublayer 302, a Radio Link Control (RLC) sublayer 303 and a Packet Data Convergence Protocol (PDCP) sublayer 304. All these sublayers terminate at the second communication nodes. The PDCP sublayer 304 provides multiplexing among variable radio bearers and logical channels. The PDCP sublayer 304 provides security by encrypting packets and also support for inter-cell handover of the first communication node between second communication nodes. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between first communication nodes various radio resources (i.e., resource block) in a cell. The MAC sublayer 302 is also in charge of HARQ operation. In the control plane 300, The RRC sublayer 306 in the L3 layer is responsible for acquiring radio resources (i.e., radio bearer) and configuring the lower layer using an RRC signaling between the second communication node and the first communication node. The radio protocol architecture in the user plane 350 comprises the L1 layer and the L2 layer. In the user plane 350, the radio protocol architecture used for the first communication node and the second communication node in a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also comprises a Service Data Adaptation Protocol (SDAP) sublayer 356, which is in charge of the mapping between QoS streams and a Data Radio Bearer (DRB), so as to support diversified traffics. Although not described in FIG. 3, the first communication node may comprise several higher layers above the L2 355, such as a network layer (i.e., IP layer) terminated at a P-GW 213 of the network side and an application layer terminated at the other side of the connection (i.e., a peer UE, a server, etc.).

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the first signaling in the present disclosure is generated by the RRC sublayer 306.

In one embodiment, the first signaling in the present disclosure is generated by the MAC sublayer 302.

In one embodiment, the first signaling in the present disclosure is generated by the MAC sublayer 352.

In one embodiment, the first signaling in the present disclosure is generated by the PHY 301.

In one embodiment, the first signaling in the present disclosure is generated by the PHY 351.

In one embodiment, the first signal in the present disclosure is generated by the PHY 301.

In one embodiment, the first signal in the present disclosure is generated by the PHY 351.

Embodiment 4

Figure 4:
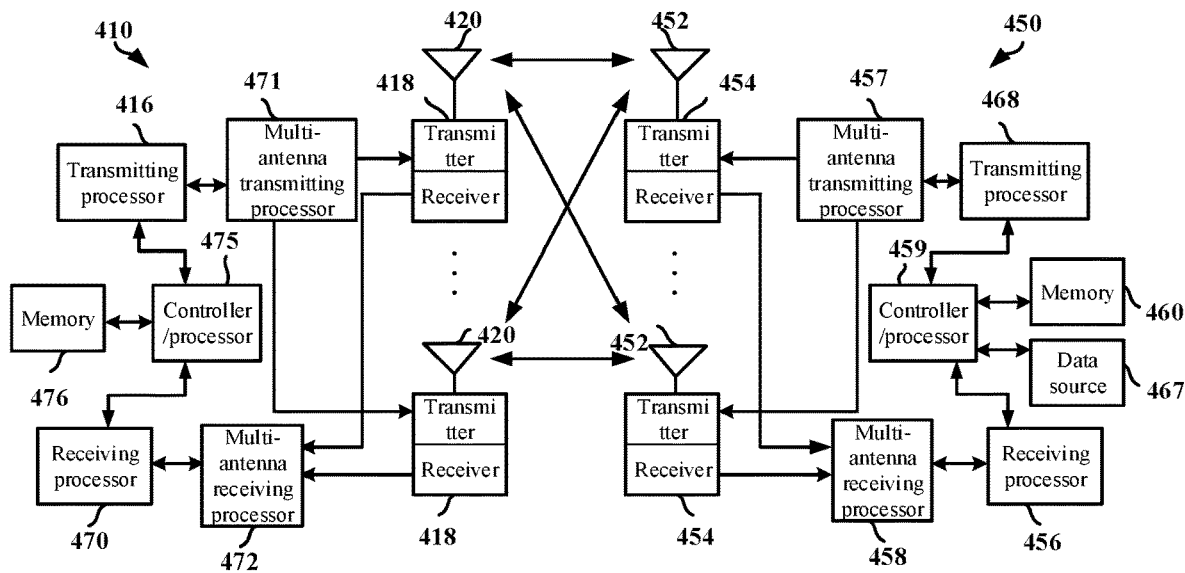
FIG. 4 illustrates a schematic diagram of a first communication device and a second communication device according to one embodiment of the present disclosure.

Embodiment 4 illustrates a schematic diagram of a first communication device and a second communication device according to the present disclosure, as shown in FIG. 4. FIG. 4 is a block diagram of a first communication device 410 and a second communication device 450 in communication with each other in an access network.

The first communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

The second communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In a transmission from the first communication device 410 to the second communication device 450, at the first communication device 410, a higher layer packet from a core network is provided to the controller/processor 475. The controller/processor 475 provides functions of the L2 layer. In the transmission from the first communication device 410 to the second communication device 450, the controller/ processor 475 provides header compression, encryption, packet segmentation and reordering, and multiplexing between a logical channel and a transport channel, and radio resource allocation of the second communication device 450 based on various priorities. The controller/processor 475 is also in charge of a retransmission of a lost packet and a signaling to the second communication device 450. The transmitting processor 416 and the multi-antenna transmitting processor 471 perform various signal processing functions used for the L1 layer (i.e., PHY). The transmitting processor 416 performs coding and interleaving so as to ensure a Forward Error Correction (FEC) at the second communication device 450 side and the mapping to signal clusters corresponding to each modulation scheme (i.e., BPSK, QPSK, M-PSK, and M-QAM, etc.). The multi-antenna transmitting processor 471 performs digital spatial precoding, which includes precoding based on codebook and precoding based on non-codebook, and beamforming processing on encoded and modulated signals to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multi-carrier symbol streams. Each transmitter 418 converts a baseband multicarrier symbol stream provided by the multi-antenna transmitting processor 471 into a radio frequency (RF) stream, which is later provided to different antennas 420.

In a transmission from the first communication device 410 to the second communication device 450, at the second communication device 450, each receiver 454 receives a signal via a corresponding antenna 452. Each receiver 454 recovers information modulated to the RF carrier, and converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs reception analog precoding/beamforming on a baseband multicarrier symbol stream provided by the receiver 454. The receiving processor 456 converts the processed baseband multicarrier symbol stream from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any second communication device 450-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted by the first communication device 410 on the physical channel. Next, the higher-layer data and control signal are provided to the controller/processor 459. The controller/processor 459 provides functions of the L2 layer. The controller/processor 459 can be associated with a memory 460 that stores program code and data. The memory 460 can be called a computer readable medium. In the transmission from the first communication device 410 to the second communication device 450, the controller/processor 459 provides demultiplexing between a transport channel and a logical channel, packet reassembling, decrypting, header decompression and control signal processing so as to recover a higher-layer packet from the core network. The higher-layer packet is later provided to all protocol layers above the L2 layer. Or various control signals can be provided to the L3 for processing.

In a transmission from the second communication device 450 to the first communication device 410, at the second communication device 450, the data source 467 is configured to provide a higher-layer packet to the controller/processor 459. The data source 467 represents all protocol layers above the L2 layer. Similar to a transmitting function of the first communication device 410 described in the transmission from the first communication node 410 to the second communication node 450, the controller/processor 459 performs header compression, encryption, packet segmentation and reordering, and multiplexing between a logical channel and a transport channel based on radio resource allocation of the first communication device 410 so as to provide the L2 layer functions used for the user plane and the control plane. The controller/processor 459 is also responsible for a retransmission of a lost packet, and a signaling to the first communication device 410. The transmitting processor 468 performs modulation and mapping, as well as channel coding, and the multi-antenna transmitting processor 457 performs digital multi-antenna spatial precoding, including precoding based on codebook and precoding based on non-codebook, and beamforming. The transmitting processor 468 then modulates generated spatial streams into multicarrier/single-carrier symbol streams. The modulated symbol streams, after being subjected to analog precoding/beamforming in the multi-antenna transmitting processor 457, are provided from the transmitter 454 to each antenna 452. Each transmitter 454 first converts a baseband symbol stream provided by the multi-antenna transmitting processor 457 into a radio frequency symbol stream, and then provides the radio frequency symbol stream to the antenna 452.

In a transmission from the second communication device 450 to the first communication device 410, the function of the first communication device 410 is similar to the receiving function of the second communication device 450 described in the transmission from the first communication device 410 to the second communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and the multi-antenna receiving processor 472 jointly provide functions of the L1 layer. The controller/processor 475 provides functions of the L2 layer. The controller/processor 475 can be associated with a memory 476 that stores program code and data. The memory 476 can be called a computer readable medium. In the transmission between the second communication device 450 and the first communication device 410, the controller/processor 475 provides de-multiplexing between a transport channel and a logical channel, packet reassembling, decrypting, header decompression, control signal processing so as to recover a higher-layer packet from the second communication device (UE) 450. The higher-layer packet coming from the controller/processor 475 may be provided to the core network.

In one embodiment, the first node in the present disclosure comprises the second communication device 450, and the second node in the present disclosure comprises the first communication device 410.

In one subembodiment, the first node is a UE, and the second node is a UE.

In one subembodiment, the first node is a UE, and the second node is a relay node.

In one subembodiment, the first node is a relay node, and the second node is a UE.

In one subembodiment, the first node is a UE, and the second node is a base station.

In one subembodiment, the first node is a relay node, and the second node is a base station.

In one subembodiment, the second node is a UE, and the first node is a base station.

In one subembodiment, the second node is a relay node, and the first node is a base station.

In one subembodiment, the second communication device 450 comprises: at least one controller/processor; the at least one controller/processor is responsible for HARQ operation.

In one subembodiment, the first communication device 410 comprises: at least one controller/processor; the at least one controller/processor is responsible for HARQ operation.

In one subembodiment, the first communication device 410 comprises: at least one controller/processor; the at least one controller/processor is responsible for using ACK and/or NACK protocols for error checking as a way of supporting HARQ operation.

In one embodiment, the second communication device 450 comprises at least one processor and at least one memory. The at least one memory comprises computer program codes; the at least one memory and the computer program codes are configured to be used in collaboration with the at least one processor. The second communication device 450 at least receives a first signaling, the first signaling being used to determine a target serving cell and a first time unit, the target serving cell being either a first serving cell or a second serving cell, where the first serving cell and the second serving cell are two different serving cells; and determines a first HARQ-ACK codebook and transmits a first signal in the first time unit on the target serving cell, the first signal carrying the first HARQ-ACK codebook, the first HARQ-ACK codebook comprising at least one HARQ-ACK information bit; herein, the first time in the present disclosure is a boundary time for an active Uplink (UL) BWP change on the first serving cell, a start of the first time unit is no earlier than the first time; the second time unit in the present disclosure is a time unit before the first time; the target serving cell is used to determine whether the first HARQ-ACK codebook comprises one or more HARQ-ACK information bits for the second time unit on the first serving cell.

In one subembodiment, the second communication device 450 corresponds to the first node in the present disclosure.

In one embodiment, the second communication device 450 comprises a memory that stores computer readable instruction program, the computer readable instruction program generates an action when executed by at least one processor, which includes: receiving a first signaling, the first signaling being used to determine a target serving cell and a first time unit, the target serving cell being either a first serving cell or a second serving cell, where the first serving cell and the second serving cell are two different serving cells; and determining a first HARQ-ACK codebook and transmits a first signal in the first time unit on the target serving cell, the first signal carrying the first HARQ-ACK codebook, the first HARQ-ACK codebook comprising at least one HARQ-ACK information bit; herein, the first time in the present disclosure is a boundary time for an active Uplink (UL) BWP change on the first serving cell, a start of the first time unit is no earlier than the first time; the second time unit in the present disclosure is a time unit before the first time; the target serving cell is used to determine whether the first HARQ-ACK codebook comprises one or more HARQ-ACK information bits for the second time unit on the first serving cell.

In one subembodiment, the second communication device 450 corresponds to the first node in the present disclosure.

In one embodiment, the first communication device 410 comprises at least one processor and at least one memory. The at least one memory comprises computer program codes; the at least one memory and the computer program codes are configured to be used in collaboration with the at least one processor. The first communication device 410 at least transmits a first signaling, the first signaling being used to determine a target serving cell and a first time unit, the target serving cell being either a first serving cell or a second serving cell, where the first serving cell and the second serving cell are two different serving cells; and receives a first signal in the first time unit on the target serving cell, the first signal carrying the first HARQ-ACK codebook, the first HARQ-ACK codebook comprising at least one HARQ-ACK information bit; herein, the first time in the present disclosure is a boundary time for an active Uplink (UL) BWP change on the first serving cell, a start of the first time unit is no earlier than the first time; the second time unit in the present disclosure is a time unit before the first time; the target serving cell is used to determine whether the first HARQ-ACK codebook comprises one or more HARQ-ACK information bits for the second time unit on the first serving cell.

In one subembodiment, the first communication device 410 corresponds to the second node in the present disclosure.

In one embodiment, the first communication device 410 comprises a memory that stores computer readable instruction program, the computer readable instruction program generates an action when executed by at least one processor, which includes: transmitting a first signaling, the first signaling being used to determine a target serving cell and a first time unit, the target serving cell being either a first serving cell or a second serving cell, where the first serving cell and the second serving cell are two different serving cells; and receiving a first signal in the first time unit on the target serving cell, the first signal carrying the first HARQ-ACK codebook, the first HARQ-ACK codebook comprising at least one HARQ-ACK information bit; herein, the first time in the present disclosure is a boundary time for an active Uplink (UL) BWP change on the first serving cell, a start of the first time unit is no earlier than the first time; the second time unit in the present disclosure is a time unit before the first time; the target serving cell is used to determine whether the first HARQ-ACK codebook comprises one or more HARQ-ACK information bits for the second time unit on the first serving cell.

In one subembodiment, the first communication device 410 corresponds to the second node in the present disclosure.

In one embodiment, at least one of the antenna 452, the receiver 454, the multi-antenna receiving processor 458, the receiving processor 456, the controller/processor 459, the memory 460, or the data source 467 is used for receiving the first signaling in the present disclosure.

In one embodiment, at least one of the antenna 420, the transmitter 418, the multi-antenna transmitting processor 471, the transmitting processor 416, the controller/processor 475 or the memory 476 is used for transmitting the first signaling in the present disclosure.

In one embodiment, at least one of the antenna 452, the transmitter 454, the multi-antenna transmitting processor 458, the transmitting processor 468, the controller/processor 459, the memory 460 or the data source 467 is used for determining the first HARQ-ACK codebook in the present disclosure.

In one embodiment, at least one of the antenna 452, the transmitter 454, the multi-antenna transmitting processor 458, the transmitting processor 468, the controller/processor 459, the memory 460, or the data source 467 is used for transmitting the first signal in the present disclosure in the first time unit in the present disclosure on the target serving cell in the present disclosure.

In one embodiment, at least one of the antenna 420, the receiver 418, the multi-antenna receiving processor 472, the receiving processor 470, the controller/processor 475, or the memory 476 is used for receiving the first signal in the present disclosure in the first time unit in the present disclosure on the target serving cell in the present disclosure.

Embodiment 5

Figure 5:
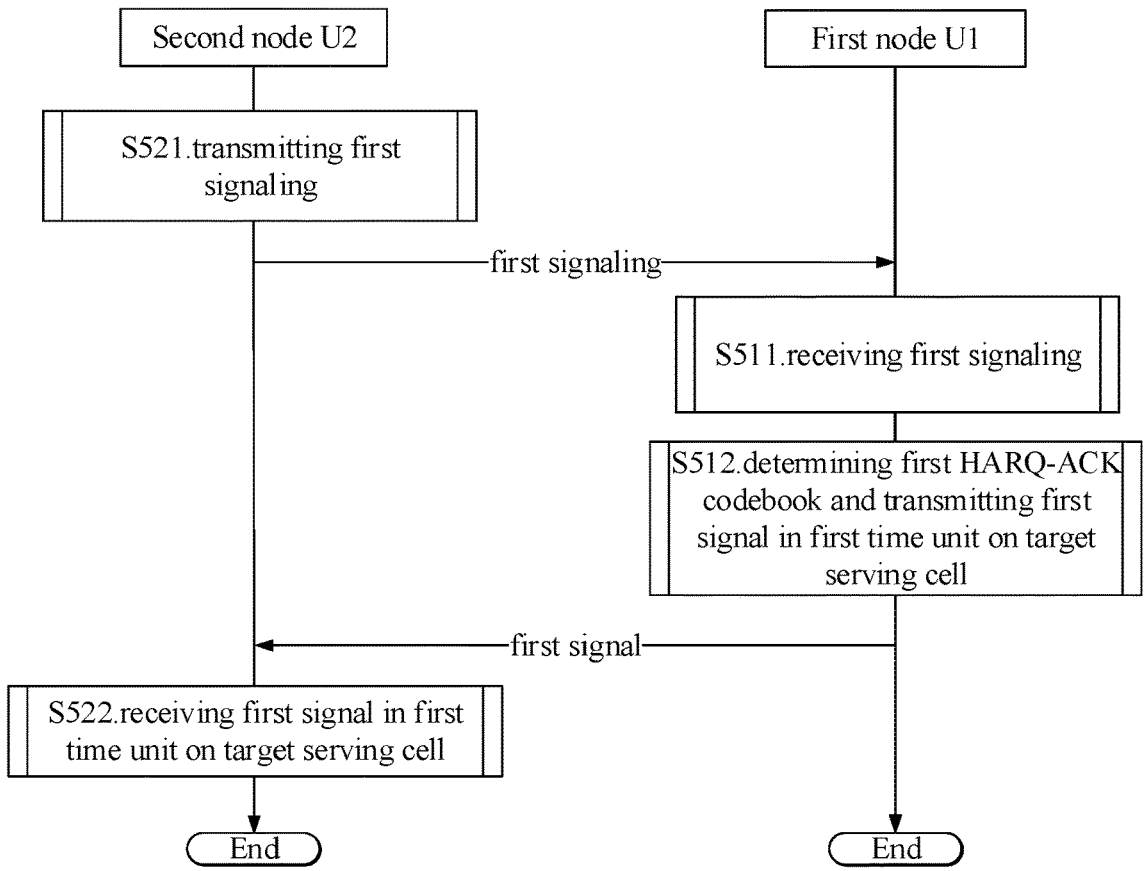
FIG. 5 illustrates a flowchart of signal transmission according to one embodiment of the present disclosure.

Embodiment 5 illustrates a flowchart of signal transmission according to one embodiment of the present disclosure, as shown in FIG. 5. In FIG. 5, a first node U1 and a second node U2 are in communications via an air interface.

The first node U1 receives a first signaling in step S511; determines a first HARQ-ACK codebook and transmits a first signal in a first time unit on a target serving cell in step S512.

The second node U2 transmits a first signaling in step S521; receives a first signal in a first time unit on a target serving cell in step S522.

In Embodiment 5, the first signaling is used to determine the target serving cell and the first time unit, the target serving cell being either a first serving cell or a second serving cell, where the first serving cell and the second serving cell are two different serving cells; the first signal carries the first HARQ-ACK codebook, the first HARQ-ACK codebook comprising at least one HARQ-ACK information bit; a first time is a boundary time for an active Uplink (UL) BWP change on the first serving cell, a start of the first time unit is no earlier than the first time; a second time unit is a time unit before the first time; the target serving cell is used to determine whether the first HARQ-ACK codebook comprises one or more HARQ-ACK information bits for the second time unit on the first serving cell; when the target serving cell is the first serving cell, the first HARQ-ACK codebook does not comprise any HARQ-ACK information bit for the second time unit on the first serving cell; when the target serving cell is the second serving cell, the first HARQ-ACK codebook comprises one or more HARQ-ACK information bits for the second time unit on the first serving cell; the first time unit is a time unit for an active UL BWP on the target serving cell, while the second time unit is a time unit for an active Downlink (DL) BWP on the first serving cell; a first timing value is used to determine the second time unit, and the first timing value is among a first timing value set, the first timing value set being pre-defined or configurable; all multicarrier symbols comprised in the second time unit are configured as properties beyond uplink.

In one subembodiment of Embodiment 5, the first serving cell and the second serving cell belong to a same PUCCH group.

In one subembodiment of Embodiment 5, the first HARQ-ACK codebook is a Type-1 HARQ-ACK codebook.

In one subembodiment of Embodiment 5, a total number of HARQ-ACK information bit(s) comprised in the first HARQ-ACK codebook is larger than a first upper-limit value, where the first upper-limit value is pre-defined or configurable; when the target serving cell is the first serving cell, the first HARQ-ACK codebook is used to generate a first bit sequence, the first bit sequence being used to generate the first signal; when the target serving cell is the second serving cell, an output by the first HARQ-ACK codebook through a first operation is used to generate a first bit sequence, the first bit sequence being used to generate the first signal; the first operation comprises at least one of logical AND operation for multiple bits or logical OR operation for multiple bits.

In one embodiment, the first node U1 is the first node in the present disclosure.

In one embodiment, the second node U2 is the second node in the present disclosure.

In one embodiment, the first node U1 is a UE.

In one embodiment, the first node U1 is a base station.

In one embodiment, the second node U2 is a base station.

In one embodiment, the second node U2 is a UE.

In one embodiment, an air interface between the second node U2 and the first node U1 is a Uu interface.

In one embodiment, an air interface between the second node U2 and the first node U1 includes a cellular link.

In one embodiment, an air interface between the second node U2 and the first node U1 is a PC5 interface.

In one embodiment, an air interface between the second node U2 and the first node U1 includes a sidelink.

In one embodiment, an air interface between the second node U2 and the first node U1 includes a radio interface between a base station and a UE.

In one embodiment, an air interface between the second node U2 and the first node U1 includes a radio interface between a UE and another UE.

In one embodiment, the first HARQ-ACK codebook comprises at least one HARQ-ACK information bit for the first serving cell.

In one embodiment, the first HARQ-ACK codebook comprises one or more HARQ-ACK information bits for an occasion for candidate PDSCH reception or SPS PDSCH release on the first serving cell.

In one embodiment, a start time for an operation which the first node performs to determine the first HARQ-ACK codebook is after reception of the first signaling.

In one embodiment, a start time for an operation which the first node performs to determine the first HARQ-ACK codebook is before reception of the first signaling.

In one embodiment, an end time for an operation which the first node performs to determine the first HARQ-ACK codebook is after reception of the first signaling.

In one embodiment, the first timing value indicates the second time unit.

In one embodiment, the first timing value implicitly indicates the second time unit.

In one embodiment, an offset indicated by the first timing value is used to determine the second time unit.

Embodiment 6

Figure 6:
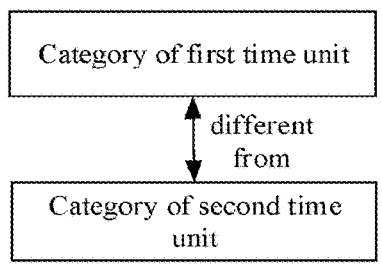
FIG. 6 illustrates a schematic diagram of a relation between categories of a first time unit and a second time unit according to one embodiment of the present disclosure.

Embodiment 6 illustrates a schematic diagram of a relation between categories of a first time unit and a second time unit according to one embodiment of the present disclosure, as shown in FIG. 6.

19

In Embodiment 6, the category of a first time unit is different from that of the second time unit.

In one embodiment, the first time unit and the second time unit are respectively for different links.

In one embodiment, the first time unit is a time unit for an active UL BWP on the target serving cell, while the second time unit is a time unit for an active Downlink (DL) BWP on the first serving cell.

In one embodiment, the first time unit is a time unit for Uplink (UL).

In one embodiment, the second time unit is a time unit for Downlink (DL).

In one embodiment, the first time unit is an Uplink slot (UL slot).

In one embodiment, the second time unit is a Downlink slot (DL slot).

In one embodiment, time lengths occupied by the first time unit and the second time unit are equal or unequal.

Embodiment 7

Figure 7:
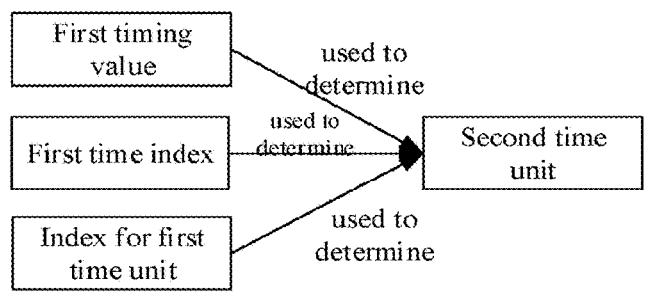
FIG. 7 illustrates a schematic diagram of relations among a first timing value, a first time index, a first time unit and a second time unit according to one embodiment of the present disclosure.

Embodiment 7 illustrates a schematic diagram of relations among a first timing value, a first time index, a first time unit and a second time unit according to one embodiment of the present disclosure, as shown in FIG. 7.

In Embodiment 7, a first timing value, a first time index and an index for a first time unit are jointly used to determine a second time unit; the first timing value is a timing value in a first timing value set, the first timing value set being a pre-defined or configurable set, where a first time index is equal to a non-negative integer.

In one embodiment, the first timing value, the first time index and an index for the first time unit are jointly used to determine an index for the second time unit.

In one embodiment, the second time unit is a time unit $\lfloor (n_U - K) \cdot 2^{\mu_{DL} - \mu_{UL}} \rfloor + n_D$); where $n_U$ is an index for the first time unit, K is equal to the first timing value, $n_D$ is equal to the first time index, $\mu_{DL}$ is a DL Subcarrier Spacing (SCS) configuration, and the $\mu_{UL}$ is a UL SCS configuration.

In one subembodiment, the $n_U$, K, $\mu_{DL}$, $\mu_{UL}$ satisfy an equation of: $\mathrm{mod}(n_U - K + 1, \max(2^{\mu_{DL} - \mu_{UL}}, 1)) = 0$.

In one embodiment, the second time unit is a time unit $$\lfloor (n_U - K) \cdot 2^{\mu_{DL} - \mu_{UL}} \rfloor + \left\lfloor \left( \frac{N^{UL}_{slot,offset}}{2^{\mu_{offset,UL}}} - \frac{N^{DL}_{slot,offset,c}}{2^{\mu_{offset,DL,c}}} \right) \right.$$

$$\left. 2^{\mu_{DL}} \right\rfloor + n_D);$$

where the $n_U$ is an index for the first time unit, K is equal to the first timing value, the $n_D$ is equal to the first time index, the $\mu_{DL}$ is a DL Subcarrier Spacing (SCS) configuration, and the $\mu_{UL}$ is a UL SCS configuration, the $N^{DL}_{slot,offset,c}$, $\mu_{offset,DL,c}$, $\mu N^{UL}_{slot,offset}$, and $\mu_{offset,UL}$ are all configurable parameter values.

In one subembodiment, the $n_U$, K, $\mu_{DL}$, $\mu_{UL}$, $N^{DL}_{slot,offset,c}$, $\mu_{offset,DL,c}$, $N^{UL}_{slot,offset}$ and $\mu_{offset,UL}$ satisfy an equation of:

$$\mathrm{mod}\left( n_U - K + \left\lfloor \left( \frac{N^{UL}_{slot,offset}}{2^{\mu_{offset,UL}}} - \frac{N^{DL}_{slot,offset,c}}{2^{\mu_{offset,DL,c}}} \right) \cdot 2^{\mu_{UL}} \right\rfloor + 1, \right.$$

20

-continued $$\left. \max(2^{\mu_{UL} - \mu_{DL}}, 1) \right) = 0.$$

In one embodiment, the first timing value set comprises at least one timing value.

In one embodiment, the first timing value set comprises {1, 2, 3, 4, 5, 6, 7, 8}.

In one embodiment, the first timing value set is configured by at least one of dl-DataToUL-ACK or dl-DataToUL-ACK-ForDCIFormat1_2.

In one embodiment, the first timing value set is a timing value set generated by a timing value set configured by at least one of dl-DataToUL-ACK or dl-DataToUL-ACK-ForDCIFormat1_2.

In one embodiment, the first timing value set is a set of slot timing values.

In one embodiment, a timing value in the first timing value set is a non-negative integer.

In one embodiment, a timing value in the first timing value set is a positive integer.

In one embodiment, a timing value in the first timing value set is a slot timing value.

In one embodiment, the first timing value is a specific timing value in the first timing value set.

In one embodiment, the first timing value is a maximum timing value in the first timing value set.

In one embodiment, the first timing value is a minimum timing value in the first timing value set.

In one embodiment, the first timing value set is a spreading timing value set.

In one embodiment, the first time index is equal to 0.

In one embodiment, the first time index is related to a subcarrier spacing configuration.

In one embodiment, the first time index is a non-negative integer less than $\max(2^{\mu_{DL} - \mu_{UL}}, 1)$, where the $\mu_{DL}$ is a DL Subcarrier Spacing (SCS) configuration, and the $\mu_{UL}$ is a UL SCS configuration.

In one embodiment, the first time index is equal to a non-negative integer from 0 to $\max(2^{\mu_{DL} - \mu_{UL}}, 1) - 1$, where the $\mu_{DL}$ is a DL Subcarrier Spacing (SCS) configuration, and the $\mu_{UL}$ is a UL SCS configuration.

In one embodiment, the first time index is an index for a DL slot in a UL slot.

Embodiment 8

Figure 8:
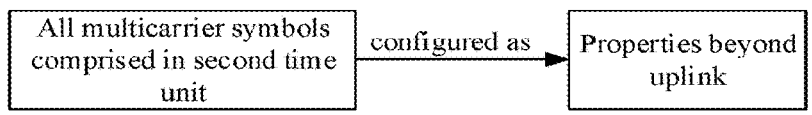
FIG. 8 illustrates a schematic diagram illustrating multi-carrier symbols comprised in a second time unit according to one embodiment of the present disclosure.

FIG. 8 illustrates a schematic diagram illustrating multicarrier symbols comprised in a second time unit according to one embodiment of the present disclosure, as shown in FIG. 8.

In Embodiment 8, all multicarrier symbols comprised in the second time unit are configured as properties beyond uplink.

In one embodiment, all multicarrier symbols comprised in the second time unit are configured as Downlink.

In one embodiment, all multicarrier symbols comprised in the second time unit are configured either as downlink symbols or flexible symbols.

In one embodiment, that all multicarrier symbols comprised in the second time unit are configured as properties beyond uplink means none of multicarrier symbols comprised in the second time unit being configured as an uplink symbol.

In one embodiment, that all multicarrier symbols comprised in the second time unit are configured as properties beyond uplink means none of multicarrier symbols comprised in the second time unit being configured as a UL property.

In one embodiment, that all multicarrier symbols comprised in the second time unit are configured as properties beyond uplink means each of multicarrier symbols comprised in the second time unit being configured as either a downlink symbol or a flexible symbol.

Embodiment 9

Figure 9:
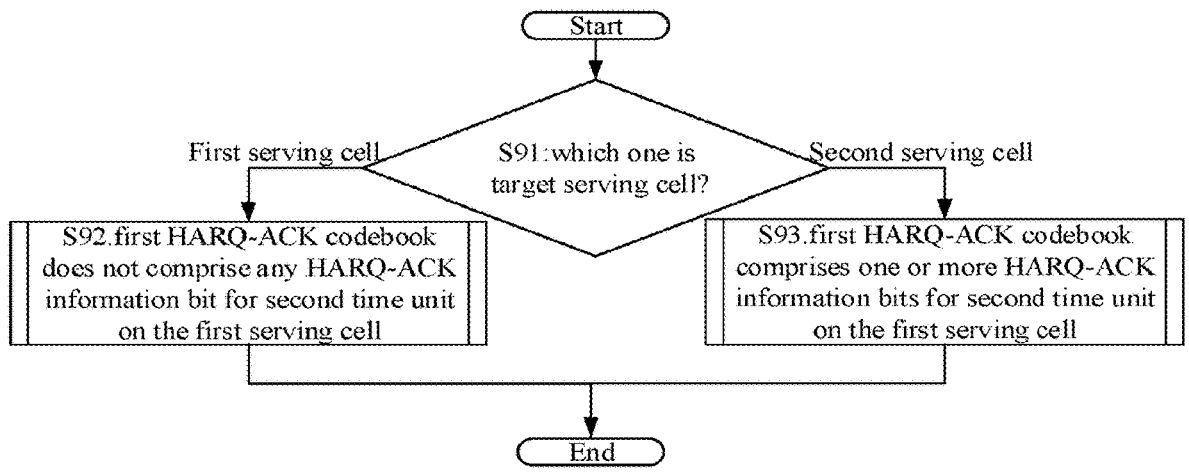
FIG. 9 illustrates a schematic diagram of determining whether first HARQ-ACK codebook comprises HARQ-ACK information bit(s) for a second time unit on a first serving cell according to one embodiment of the present disclosure.

Embodiment 9 illustrates a schematic diagram of determining whether first HARQ-ACK codebook comprises HARQ-ACK information bit(s) for a second time unit on a first serving cell according to one embodiment of the present disclosure, as shown in FIG. 9.

In Embodiment 9, the first node in the present disclosure determines whether a target serving cell is a first serving cell or a second serving cell in step S91; if the target serving cell is the first serving cell, proceed to step S92 to determine that the first HARQ-ACK codebook does not comprise any HARQ-ACK information bit for the second time unit on the first serving cell; if the target serving cell is the second serving cell, proceed to step S93 to determine that the first HARQ-ACK codebook comprises one or more HARQ-ACK information bits for the second time unit on the first serving cell.

Embodiment 10

Figure 10:
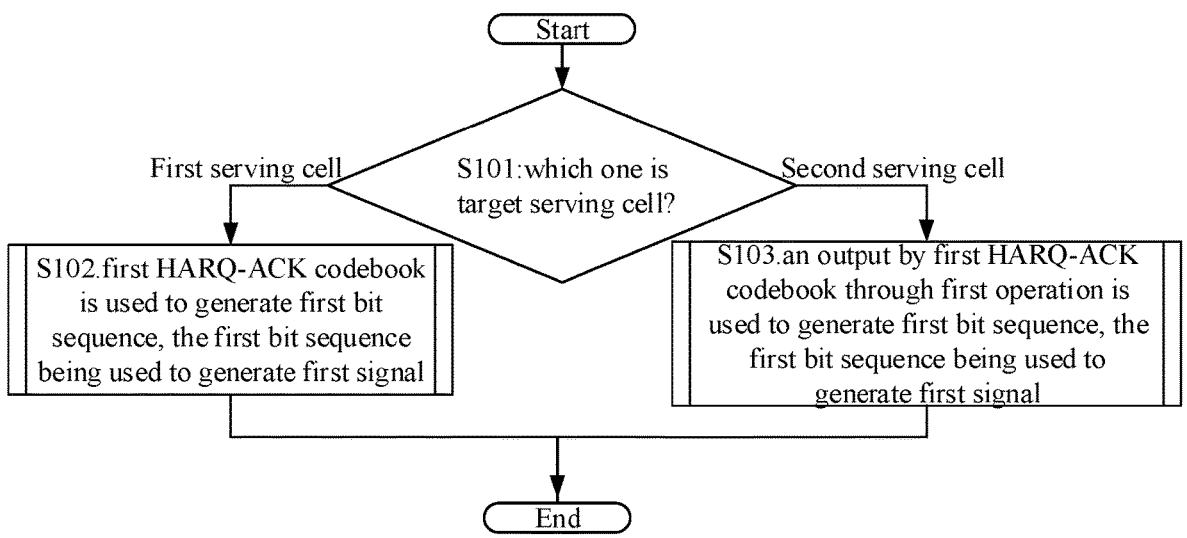
FIG. 10 illustrates a schematic diagram of determining a way in which a first HARQ-ACK codebook is used to generate a first signal according to one embodiment of the present disclosure.

Embodiment 10 illustrates a schematic diagram of determining a way in which a first HARQ-ACK codebook is used to generate a first signal according to one embodiment of the present disclosure, as shown in FIG. 10.

In Embodiment 10, the first node in the present disclosure determines whether a target serving cell is a first serving cell or a second serving cell in step S101; if the target serving cell is the first serving cell, proceed to step S102 to determine that the first HARQ-ACK codebook is used to generate a first bit sequence, the first bit sequence being used to generate a first signal; if the target serving cell is the second serving cell, proceed to step S103 to determine that an output by the first HARQ-ACK codebook through first operation is used to generate a first bit sequence, the first bit sequence being used to generate a first signal.

In Embodiment 10, a total number of HARQ-ACK information bits comprised in the first HARQ-ACK codebook is larger than a first upper-limit value, the first upper-limit value being pre-defined or configurable.

In one embodiment, the first upper-limit value is equal to 1.

In one embodiment, the first upper-limit value is equal to 2.

In one embodiment, the first upper-limit value is equal to a positive integer no greater than 1706.

In one embodiment, the first upper-limit value is equal to a pre-defined positive integer.

In one embodiment, the first upper-limit value is configurable.

In one embodiment, when the target serving cell is the second serving cell, a total number of bits comprised in the output by the first HARQ-ACK codebook through the first operation is no larger than the first upper-limit value.

In one embodiment, the phrase that the first HARQ-ACK codebook is used to generate a first bit sequence means that the first bit sequence comprises an output by all or partial bits in the first HARQ-ACK codebook sequentially through some or all of CRC Attachment, Segmentation, Code-block-level CRC Attachment, Channel Coding, Rate Matching, and Concatenation, or the first bit sequence is the first HARQ-ACK codebook.

In one embodiment, the phrase that an output by the first HARQ-ACK codebook through a first operation is used to generate a first bit sequence means that the first bit sequence comprises an output by all or partial bits in the output by the first HARQ-ACK codebook through the first operation being sequentially through some or all of CRC Attachment, Segmentation, Code-block-level CRC Attachment, Channel Coding, Rate Matching, and Concatenation, or the first bit sequence is the output by the first HARQ-ACK codebook through the first operation.

In one embodiment, the phrase of the first bit sequence being used to generate a/the first signal means: the first signal comprises an output by all or part of bits in the first bit sequence sequentially through some or all of Scrambling, Modulation, Spreading, Layer Mapping, Precoding, Mapping to Resource Element, Multicarrier Symbol Generation, and Modulation and Upconversion.

Embodiment 11

Figure 11:
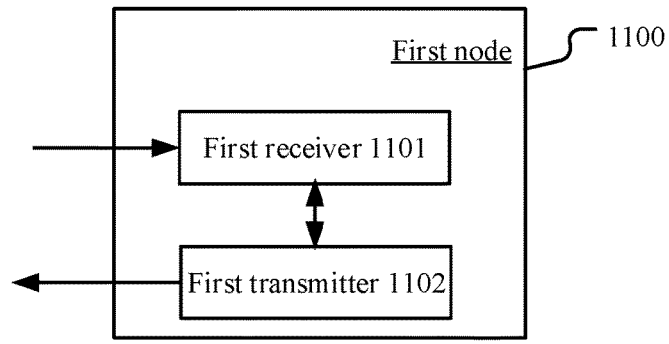
FIG. 11 illustrates a structure block diagram of a processing device in a first node according to one embodiment of the present disclosure.

Embodiment 11 illustrates a structure block diagram of a processing device in a first node, as shown in FIG. 11. In FIG. 11, a processing device 1100 in the first node is comprised of a first receiver 1101 and a first transmitter 1102.

In one embodiment, the first node 1100 is a UE.

In one embodiment, the first node 1100 is a relay node.

In one embodiment, the first node 1100 is vehicle-mounted communication equipment.

In one embodiment, the first node 1100 is a UE supporting V2X communications.

In one embodiment, the first node 1100 is a relay node supporting V2X communications.

In one embodiment, the first receiver 1101 comprises at least one of the antenna 452, the receiver 454, the multi-antenna receiving processor 458, the receiving processor 456, the controller/processor 459, the memory 460 or the data source 467 in FIG. 4 of the present disclosure.

In one embodiment, the first receiver 1101 comprises at least the first five of the antenna 452, the receiver 454, the multi-antenna receiving processor 458, the receiving processor 456, the controller/processor 459, the memory 460 and the data source 467 in FIG. 4 of the present disclosure.

In one embodiment, the first receiver 1101 comprises at least the first four of the antenna 452, the receiver 454, the multi-antenna receiving processor 458, the receiving processor 456, the controller/processor 459, the memory 460 and the data source 467 in FIG. 4 of the present disclosure.

In one embodiment, the first receiver 1101 comprises at least the first three of the antenna 452, the receiver 454, the multi-antenna receiving processor 458, the receiving processor 456, the controller/processor 459, the memory 460 and the data source 467 in FIG. 4 of the present disclosure.

In one embodiment, the first receiver 1101 comprises at least the first two of the antenna 452, the receiver 454, the multi-antenna receiving processor 458, the receiving processor 456, the controller/processor 459, the memory 460 and the data source 467 in FIG. 4 of the present disclosure.

In one embodiment, the first transmitter 1102 comprises at least one of the antenna 452, the transmitter 454, the multi-antenna transmitting processor 457, the transmitting processor 468, the controller/processor 459, the memory 460 or the data source 467 in FIG. 4 of the present disclosure.

In one embodiment, the first transmitter 1102 comprises at least the first five of the antenna 452, the transmitter 454, the multi-antenna transmitting processor 457, the transmitting processor 468, the controller/processor 459, the memory 460 and the data source 467 in FIG. 4 of the present disclosure.

In one embodiment, the first transmitter 1102 comprises at least the first four of the antenna 452, the transmitter 454, the multi-antenna transmitting processor 457, the transmitting processor 468, the controller/processor 459, the memory 460 and the data source 467 in FIG. 4 of the present disclosure.

In one embodiment, the first transmitter 1102 comprises at least the first three of the antenna 452, the transmitter 454, the multi-antenna transmitting processor 457, the transmitting processor 468, the controller/processor 459, the memory 460 and the data source 467 in FIG. 4 of the present disclosure.

In one embodiment, the first transmitter 1102 comprises at least the first two of the antenna 452, the transmitter 454, the multi-antenna transmitting processor 457, the transmitting processor 468, the controller/processor 459, the memory 460 and the data source 467 in FIG. 4 of the present disclosure.

In Embodiment 11, the first receiver 1101 receives a first signaling, the first signaling being used to determine a target serving cell and a first time unit, the target serving cell being either a first serving cell or a second serving cell, where the first serving cell and the second serving cell are two different serving cells; the first transmitter 1102 determines a first HARQ-ACK codebook and transmits a first signal in the first time unit on the target serving cell; the first signal carries the first HARQ-ACK codebook, the first HARQ-ACK codebook comprising at least one HARQ-ACK information bit; a first time is a boundary time for an active Uplink (UL) BWP change on the first serving cell, a start of the first time unit is no earlier than the first time; a second time unit is a time unit before the first time; the target serving cell is used to determine whether the first HARQ-ACK codebook comprises one or more HARQ-ACK information bits for the second time unit on the first serving cell.

In one embodiment, when the target serving cell is the first serving cell, the first HARQ-ACK codebook does not comprise any HARQ-ACK information bit for the second time unit on the first serving cell; when the target serving cell is the second serving cell, the first HARQ-ACK codebook comprises one or more HARQ-ACK information bits for the second time unit on the first serving cell.

In one embodiment, the first serving cell and the second serving cell belong to a same PUCCH group.

In one embodiment, the first time unit is a time unit for an active UL BWP on the target serving cell, while the second time unit is a time unit for an active Downlink (DL) BWP on the first serving cell.

In one embodiment, the a first timing value is used to determine the second time unit, and the first timing value is among a first timing value set, the first timing value set being pre-defined or configurable.

In one embodiment, all multicarrier symbols comprised in the second time unit are configured as properties beyond uplink.

In one embodiment, a total number of HARQ-ACK information bit(s) comprised in the first HARQ-ACK codebook is larger than a first upper-limit value, where the first upper-limit value is pre-defined or configurable; when the target serving cell is the first serving cell, the first HARQ-ACK codebook is used to generate a first bit sequence, the first bit sequence being used to generate the first signal; when the target serving cell is the second serving cell, an output by the first HARQ-ACK codebook through a first operation is used to generate a first bit sequence, the first bit sequence being used to generate the first signal; the first operation comprises at least one of logical AND operation for multiple bits or logical OR operation for multiple bits.

In one embodiment, the first HARQ-ACK codebook is a Type-1 HARQ-ACK codebook.

Embodiment 12

Figure 12:
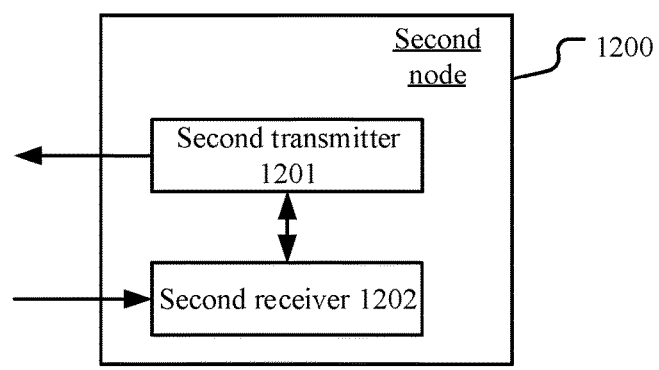
FIG. 12 illustrates a structure block diagram a processing device in a second node according to one embodiment of the present disclosure.

Embodiment 12 illustrates a structure block diagram a processing device in a second node according to one embodiment of the present disclosure, as shown in FIG. 12. In FIG. 12, a processing device 1200 in the second node is comprised of a second transmitter 1201 and a second receiver 1202.

In one embodiment, the second node 1200 is a UE.

In one embodiment, the second node 1200 is a base station.

In one embodiment, the second node 1200 is a relay node.

In one embodiment, the second node 1200 is vehicle-mounted communication equipment.

In one embodiment, the second node 1200 is UE supporting V2X communications.

In one embodiment, the second transmitter 1201 comprises at least one of the antenna 420, the transmitter 418, the multi-antenna transmitting processor 471, the transmitting processor 416, the controller/processor 475 or the memory 476 in FIG. 4 of the present disclosure.

In one embodiment, the second transmitter 1201 comprises at least the first five of the antenna 420, the transmitter 418, the multi-antenna transmitting processor 471, the transmitting processor 416, the controller/processor 475 and the memory 476 in FIG. 4 of the present disclosure.

In one embodiment, the second transmitter 1201 comprises at least the first four of the antenna 420, the transmitter 418, the multi-antenna transmitting processor 471, the transmitting processor 416, the controller/processor 475 and the memory 476 in FIG. 4 of the present disclosure.

In one embodiment, the second transmitter 1201 comprises at least the first three of the antenna 420, the transmitter 418, the multi-antenna transmitting processor 471, the transmitting processor 416, the controller/processor 475 and the memory 476 in FIG. 4 of the present disclosure.

In one embodiment, the second transmitter 1201 comprises at least the first two of the antenna 420, the transmitter 418, the multi-antenna transmitting processor 471, the transmitting processor 416, the controller/processor 475 and the memory 476 in FIG. 4 of the present disclosure.

In one embodiment, the second receiver 1202 comprises at least one of the antenna 420, the receiver 418, the multi-antenna receiving processor 472, the receiving processor 470, the controller/processor 475 or the memory 476 in FIG. 4 of the present disclosure.

In one embodiment, the second receiver 1202 comprises at least the first five of the antenna 420, the receiver 418, the multi-antenna receiving processor 472, the receiving processor 470, the controller/processor 475 and the memory 476 in FIG. 4 of the present disclosure.

In one embodiment, the second receiver 1202 comprises at least the first four of the antenna 420, the receiver 418, the multi-antenna receiving processor 472, the receiving processor 470, the controller/processor 475 and the memory 476 in FIG. 4 of the present disclosure.

In one embodiment, the second receiver 1202 comprises at least the first three of the antenna 420, the receiver 418, the multi-antenna receiving processor 472, the receiving processor 470, the controller/processor 475 and the memory 476 in FIG. 4 of the present disclosure.

In one embodiment, the second receiver 1202 comprises at least the first two of the antenna 420, the receiver 418, the multi-antenna receiving processor 472, the receiving processor 470, the controller/processor 475 and the memory 476 in FIG. 4 of the present disclosure.

In Embodiment 12, the second transmitter 1201 transmits a first signaling, the first signaling being used to determine a target serving cell and a first time unit, the target serving cell being either a first serving cell or a second serving cell, where the first serving cell and the second serving cell are two different serving cells; the second receiver 1202 receives a first signal in the first time unit on the target serving cell; the first signal carries a first HARQ-ACK codebook, the first HARQ-ACK codebook comprising at least one HARQ-ACK information bit; a first time is a boundary time for an active Uplink (UL) BWP change on the first serving cell, a start of the first time unit is no earlier than the first time; a second time unit is a time unit before the first time; the target serving cell is used to determine whether the first HARQ-ACK codebook comprises one or more HARQ-ACK information bits for the second time unit on the first serving cell.

In one embodiment, when the target serving cell is the first serving cell, the first HARQ-ACK codebook does not comprise any HARQ-ACK information bit for the second time unit on the first serving cell; when the target serving cell is the second serving cell, the first HARQ-ACK codebook comprises one or more HARQ-ACK information bits for the second time unit on the first serving cell.

In one embodiment, the first serving cell and the second serving cell belong to a same PUCCH group.

In one embodiment, the first time unit is a time unit for an active UL BWP on the target serving cell, while the second time unit is a time unit for an active Downlink (DL) BWP on the first serving cell.

In one embodiment, the a first timing value is used to determine the second time unit, and the first timing value is among a first timing value set, the first timing value set being pre-defined or configurable.

In one embodiment, all multicarrier symbols comprised in the second time unit are configured as properties beyond uplink.

In one embodiment, a total number of HARQ-ACK information bit(s) comprised in the first HARQ-ACK codebook is larger than a first upper-limit value, where the first upper-limit value is pre-defined or configurable; when the target serving cell is the first serving cell, the first HARQ-ACK codebook is used to generate a first bit sequence, the first bit sequence being used to generate the first signal; when the target serving cell is the second serving cell, an output by the first HARQ-ACK codebook through a first operation is used to generate a first bit sequence, the first bit sequence being used to generate the first signal; the first operation comprises at least one of logical AND operation for multiple bits or logical OR operation for multiple bits.

In one embodiment, the first HARQ-ACK codebook is a Type-1 HARQ-ACK codebook.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The first node in the present disclosure includes but is not limited to mobile phones, tablet computers, notebooks, network cards, low-consumption equipment, enhanced MTC (eMTC) terminals, NB-IOT terminals, vehicle-mounted communication equipment, aircrafts, airplanes, unmanned aerial vehicles, telecontrolled aircrafts, etc. The second node in the present disclosure includes but is not limited to mobile phones, tablet computers, notebooks, network cards, low-consumption equipment, enhanced MTC (eMTC) terminals, NB-IOT terminals, vehicle-mounted communication equipment, aircrafts, airplanes, unmanned aerial vehicles, telecontrolled aircrafts, etc. The UE or terminal in the present disclosure includes but is not limited to mobile phones, tablet computers, notebooks, network cards, low-consumption equipment, enhanced MTC (eMTC) terminals, NB-IOT terminals, vehicle-mounted communication equipment, aircrafts, airplanes, unmanned aerial vehicles, telecontrolled aircrafts, etc. The base station in the present disclosure includes but is not limited to macro-cellular base stations, micro-cellular base stations, home base stations, relay base station, eNB, gNB, Transmitter Receiver Point (TRP), GNSS, relay satellite, satellite base station, airborne base station, test apparatus, test equipment or test instrument, and other radio communication equipment.

It will be appreciated by those skilled in the art that this disclosure can be implemented in other designated forms without departing from the core features or fundamental characters thereof. The currently disclosed embodiments, in any case, are therefore to be regarded only in an illustrative, rather than a restrictive sense. The scope of invention shall be determined by the claims attached, rather than according to previous descriptions, and all changes made with equivalent meaning are intended to be included therein.

What is claimed is:

1. A user equipment (UE) comprising:
    a transceiver; and
    a processor;
    wherein the transceiver and the processor are configured to:
        receive a downlink control information (DCI), the DCI indicating:
            (i) a target serving cell, the target serving cell being one of a first serving cell or a second serving cell; and
            (ii) a timing value that indicates an uplink (UL) slot;
        determine a Hybrid Automatic Repeat Request Acknowledgement (HARQ-ACK) codebook;
        determine, based on the target serving cell, whether the HARQ-ACK codebook includes one or more HARQ-ACK information bits corresponding to a downlink (DL) slot on the first serving cell; and
        transmit, via the target serving cell, the HARQ-ACK codebook in the UL slot, the UL slot starting at or after a boundary time at which an active UL bandwidth part (BWP) on the target serving cell changes, wherein the DL slot on the first serving cell precedes the boundary time.

2. The UE of claim 1, wherein, when the target serving cell is the first serving cell, the HARQ-ACK codebook omits any HARQ-ACK information bits for the DL slot on the first serving cell.

3. The UE of claim 1, wherein, when the target serving cell is the second serving cell, the HARQ-ACK codebook includes one or more HARQ-ACK information bits for the DL slot on the first serving cell.

4. The UE of claim 1, wherein the first serving cell is a primary Cell (PCell).

5. The UE of claim 1, wherein the second serving cell is a secondary Cell (SCell).

6. The UE of claim 1, wherein the HARQ-ACK codebook is a Type-1 HARQ-ACK codebook.

7. The UE of claim 1, wherein the UL slot is a slot for an active UL BWP on the target serving cell.

8. The UE of claim 1, wherein the DL slot is a slot for an active DL BWP on the first serving cell.

9. A method performed by a user equipment (UE), the method comprising:
- receiving a downlink control information (DCI), the DCI indicating:
  - (i) a target serving cell, the target serving cell being selected from among a first serving cell and a second serving cell; and
  - (ii) a timing value that indicates an uplink (UL) slot;
- determining a Hybrid Automatic Repeat Request Acknowledgement (HARQ-ACK) codebook;
- determining, based on the target serving cell, whether the HARQ-ACK codebook includes one or more HARQ-ACK information bits corresponding to a downlink (DL) slot on the first serving cell; and
- transmitting, via the target serving cell, the HARQ-ACK codebook in the UL slot, the UL slot starting at or after a boundary time at which an active UL bandwidth part (BWP) on the target serving cell changes, wherein the DL slot on the first serving cell precedes the boundary time.

10. The method of claim 9, wherein, when the target serving cell is the first serving cell, the HARQ-ACK codebook omits any HARQ-ACK information bits for the DL slot on the first serving cell.

11. The method of claim 9, wherein, when the target serving cell is the second serving cell, the HARQ-ACK codebook includes one or more HARQ-ACK information bits for the DL slot on the first serving cell.

12. The method of claim 9, wherein the first serving cell is a primary Cell (PCell).

13. The method of claim 9, wherein the second serving cell is a secondary Cell (SCell).

14. The method of claim 9, wherein the HARQ-ACK codebook is a Type-1 HARQ-ACK codebook.

15. The method of claim 9, wherein the UL slot is a slot for an active UL BWP on the target serving cell.

16. The method of claim 9, wherein the DL slot is a slot for an active DL BWP on the first serving cell.

17. A base station (BS) comprising:
- a transceiver; and
- a processor;
- wherein the transceiver and the processor are configured to:
  - transmit a downlink control information (DCI), the DCI indicating:
    - (i) a target serving cell, the target serving cell being selected from among a first serving cell and a second serving cell; and
    - (ii) a timing value that indicates an uplink (UL) slot; and
  - receive, on the target serving cell, a physical uplink control channel (PUCCH) carrying Hybrid Automatic Repeat Request Acknowledgement (HARQ-ACK) information according to a HARQ-ACK codebook in the UL slot, the UL slot starting at or after a boundary time at which an active UL bandwidth part (BWP) on the target serving cell changes, wherein a downlink (DL) slot on the first serving cell precedes the boundary time.

18. The BS of claim 17, wherein, when the target serving cell is the first serving cell, the HARQ-ACK codebook omits any HARQ-ACK information bits for the DL slot on the first serving cell.

19. The BS of claim 17, wherein, when the target serving cell is the second serving cell, the HARQ-ACK codebook includes one or more HARQ-ACK information bits for the DL slot on the first serving cell.

20. The BS of claim 17, wherein the first serving cell is a primary Cell (PCell) and the second serving cell is a secondary Cell (SCell).

\* \* \* \* \*